Figure 1:
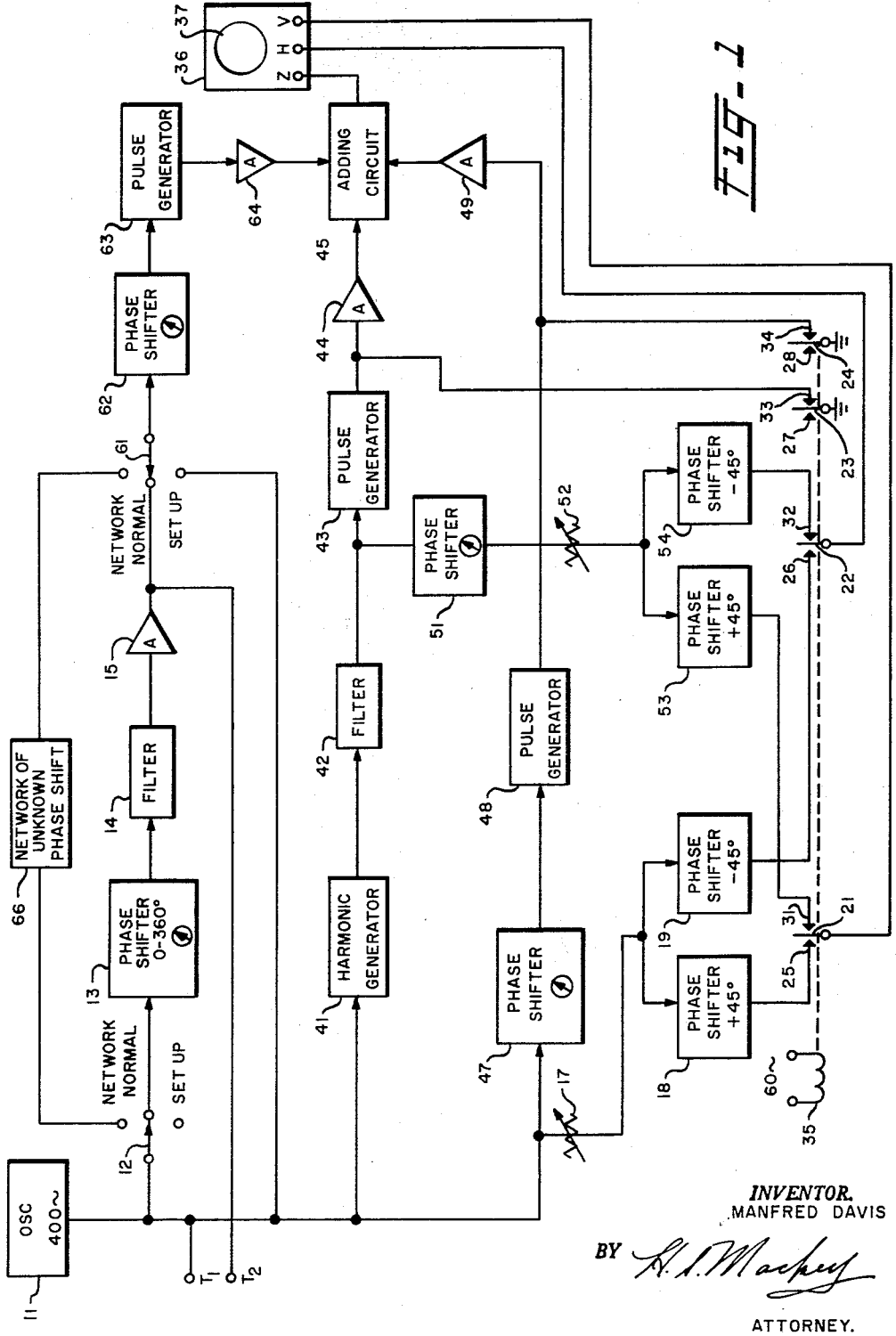
Figure 2:
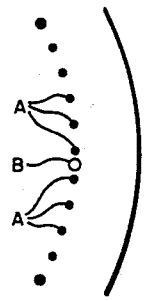

Sept. 22, 1964    M. DAVIS    3,150,316
PHASE MEASURING DEVICE INCLUDING FREQUENCY MULTIPLYING
MEANS FOR ACCOMPLISHING FINE AND COARSE MEASUREMENTS
Filed Aug. 16, 1960    2 Sheets-Sheet 1

INVENTOR.
MANFRED DAVIS
BY *H. S. Mackey*
ATTORNEY.

United States Patent Office 3,150,316
Patented Sept. 22, 1964

3,150,316
PHASE MEASURING DEVICE INCLUDING FREQUENCY MULTIPLYING MEANS FOR ACCOMPLISHING FINE AND COARSE MEASUREMENTS
Manfred Davis, Bronxville, N.Y., assignor to General Precision, Inc., a corporation of Delaware
Filed Aug. 16, 1960, Ser. No. 49,872
2 Claims. (Cl. 324—88)

This invention relates to apparatus for measuring very accurately the phase difference between two alternating voltages and represents an improvement upon the apparatus described and claimed in the copending application of Manfred Davis, Serial No. 755,019, filed August 18, 1958, now United States Patent 2,987,675, for Laboratory Phase Standard.

Laboratories frequently need apparatus for measuring accurately the difference in phase between two voltages. Prior to the invention described in the above mentioned application Serial No. 755,019, several methods for measuring phase difference were in use. In one method, the two voltages were applied to the horizontal and vertical deflection systems respectively of an oscilloscope so that the shape of the resulting pattern could be used as an indication of phase difference. As another example, the two voltages were displayed simultaneously, the distance between like portions being a measure of phase difference. Alternatively, one voltage was used to generate a horizontal or circular trace and the other to brighten or deflect the trace periodically, the distance from a reference point to the brightened or deflected trace being a measure of phase difference. All such arrangements of which applicant was aware were limited in the accuracy of measurement attainable to about plus or minus two degrees.

Another approach to the problem employed a calibrated phase shifter. One voltage was passed through the shifter which was adjusted to produce a minimum difference between its output and the other voltage. While significantly better accuracy is obtainable with such an arrangement, the construction and calibration of the phase shifter is expensive because the accuracy is dependent upon the accuracy with which the characteristics of the components is known.

The invention described and claimed in the above mentioned application Serial No. 755,019 is an improvement over the above methods and apparatus in that, by providing both a coarse and fine measure, phase differences can be measured to a small fraction of a degree. Nevertheless, the apparatus of application Serial No. 755,019 has certain disadvantages. First, the fine measure of phase is made along the diameter of the oscilloscope screen, thereby limiting the accuracy. Second, the scale indicative of fine measure must be calibrated. Third, it its inconvenient to read the coarse measure on the oscilloscope screen and the fine measure on a separate scale.

It is a general object of the present invention to provide apparatus for measuring the difference in phase between two alternating voltages.

Another object is to provide phase measuring apparatus in which phase difference may be measured with great accuracy.

Another object is to provide phase measuring apparatus in which phase difference may be read directly without the necessity for adjusting and reading an auxiliary indicator.

Another object is to provide apparatus for obtaining two voltages differing in phase from each other by any desired amount.

Another object is to provide apparatus for measuring the phase shift introduced by a network of unknown characteristics.

In accordance with the invention, one voltage is regarded as a reference and from this voltage are derived two voltages in quadrature with each other which voltages are applied to the two deflection systems of an oscilloscope to generate a circular beam. The trace is normally suppressed so that light appears only when a voltage is applied to the intensity control circuit. A harmonic generator is connected to the reference voltage and its output applied to a pulse generator which generates pulses of very short duration which in turn are applied to the intensity control circuit so that a series of light spots, for example sixty, appear in a circle on the screen. One of these spots is intensified to serve as a reference. The output of the harmonic generator is also divided into quadrature components which are applied to the deflection systems on a time shared basis with the other quadrature voltages so as to generate a second circle of slightly smaller diameter. The voltage of unknown phase is passed through a circuit which generates a series of pulses, one per cycle, which are applied to the intensity control circuit. As a result, two light spots appear, one on each circle. The angular distances from the reference spot to the spots on the outer and inner circles are coarse and fine measures respectively of phase difference.

For a clearer understanding of the invention reference may be made to the following detailed description and the accompanying drawing, in which:

FIGURE 1 is a diagram, partly in block form and partly schematic, of a preferred embodiment of the invention; and FIGURES 2 to 6 inclusive are diagrams showing the relative positions of spots on the oscilloscope screen and are useful in explaining the invention.

Referring first to FIGURE 1, there is shown a source of alternating current such as a 400 cycle oscillator 11 which supplies the reference voltage and which is connected to an output terminal $T_1$. The oscillator 11 is also connected through the middle or normal contact of a single pole triple throw switch 12 to an adjustable phase shifter 13 capable of supplying an output voltage having any phase from zero to 360° with respect to its input voltage. The phase shifter 13 need not be calibrated and may, for example, comprise an inductive resolver having two mutually perpendicular stator windings excited in quadrature so that a rotating field is set up which links with the turns of a rotatable secondary winding which thus has induced therein a voltage the phase of which depends upon its angular position.

The output of the phase shifter 13 is connected to a filter 14 which corrects any distortion introduced by the phase shifter 13 and makes the output very nearly sinusoidal. From the filter 14 the voltage is passed through an amplifier 15, the output of which is connected to another output terminal $T_2$. It is obvious that by adjusting the phase shifter 13 two output voltages can be obtained at terminals $T_1$ and $T_2$ which differ in phase by any desired amount. The problem lies in measuring this phase difference accurately and the remainder of the apparatus is devoted to the solution of this problem.

The oscillator 11 is also connected through a variable attenuator 17 to two phase shifting circuits 18 and 19. These circuits may be simple resistor-capacitor networks which serve to supply two output voltages of equal magnitude in phase quadrature with each other. As illustrated in the drawing, the outputs are shown as having phases of plus forty five degrees and minus forty five degrees respectively with respect to the input since this phase relationship is readily obtainable.

At the bottom of FIG. 1 are shown four single pole double throw switches 21, 22, 23 and 24 having left contacts 25, 26, 27 and 28 and right contacts 31, 32, 33 and 34. These switches are mechanically connected together and are cyclically operated at a frequency low compared to the frequency of source 11 by means of an operating winding 35 which may be connected to the sixty cycle line. The phase shifters 18 and 19 are connected to the contacts 25 and 26 of the switches 21 and 22 while the armatures of these switches are connected to the horizontal and vertical deflection terminals respectively of an oscilloscope 36. Accordingly, when the switches 21, 22, 23, and 24 are in their left hand position, the electron beam of the oscilloscope 36 follows a circular pattern but the intensity is adjusted so that no trace appears on the screen 37 unless a suitable voltage is applied to the intensity control terminal Z.

The oscillator 11 is also connected to a harmonic generator 41 which generates an output the frequency of which is a high harmonic, for example the sixtieth, of its input. The harmonic generator 41 is followed by a filter 42 which smooths the wave form and the filter 42 is in turn followed by a pulse generator 43 which generates one narrow pulse for each cycle. The output of the pulse generator 43 is passed through an isolating amplifier 44 and an adding circuit 45 to the intensity control terminal Z of the oscilloscope 36. Accordingly, sixty equally spaced light spots arranged in a circle appear on the screen 37.

The oscillator 11 is also connected to an adjustable phase shifter 47 which may be a simple resistor-capacitor network capable of varying the phase of the output over a range of a few degrees. The output of the phase shifter 47 is connected to a pulse generator 48 which generates one narrow pulse for each cycle of the applied voltage. The pulse so generated is passed through an isolating amplifier 49 and the adding circuit 45 to the intensity control terminal Z. Accordingly, one light spot appears on the screen 37 somewhere on the circle containing the above mentioned sixty spots. By adjusting the phase shifter 47 this one spot may be made to coincide with one of the sixty spots.

The output of the filter 42 is also connected to a phase shifter 51, similar to the phase shifter 47. The output of the phase shifter 51 is connected, through an adjustable attenuator 52, to two phase shifters 53 and 54, similar to the phase shifters 18 and 19, which generate output voltages of equal amplitude in phase quadrature with each other at the frequency of the harmonic generator 41. The phase shifters 53 and 54 are connected to the right hand contacts 31 and 32 of the switches 21 and 22 so that when the switches are in their right hand position the electron beam of the oscilloscope 36 follows a second circular path. The attenuators 17 and 52 are adjusted so that the second circle, generated at the frequency of the harmonic generator 41, is of slightly smaller diameter. However, no luminous trace of the second circle is generated by the apparatus so far described because the pulse generators 43 and 48 are connected to the right hand contacts 33 and 34 of the switches 27 and 28, the armatures of which are grounded. It is apparent that, when the switches 21, 22, 23, and 24 are in their right hand position, the pulse generators 43 and 48 are grounded and accordingly the trace is not brightened.

The output of the amplifier 15, which is a voltage of unknown phase, is connected through the middle, or normal, contact of a single pole triple throw switch 61 to an adjustable phase shifter 62, similar to the phase shifters 47 and 51 which in turn is connected to a pulse generator 63 which generates a narrow pulse once each cycle of the applied voltage. This pulse is passed through an isolating amplifier 64 to the adding circuit 45 and thence to the intensity control terminal Z of the oscilloscope 36. This pulse occurs once each cycle of the 400 cycle reference voltage and therefore places one light spot on the outer circle because, it will be recalled, the outer circle is generated when the switches 21 to 24 are in their left hand position at which time the quadrature voltages applied to the deflection systems are derived from the 400 cycle source 11. When the switches 21 to 24 are in their right hand position the inner circle is generated from the 24 kc. voltage from the harmonic generator 41 and accordingly the pulse generator 63 emits one pulse for each sixty revolutions of the inner circle. The result, of course, is the same, that is, each pulse from the pulse generator 63 puts one spot of light on the inner circle. The two spots of light caused by each pulse from the pulse generator 63, one on the outer circle and one on the inner circle, appear at circumferential, or angular, positions determined by the setting of the phase shifter 13. As will be more fully explained, the angular positions of these spots is a measure of the phase of the voltage at the output of the amplifier 15 (which voltage also appears at the terminal $T_2$).

The switches 12 and 61 have lower, or set up positions in which the phase shifter 13 is disconnected from the source 11 and in which the phase shifter 62 is connected directly to the source 11. These switches also have an upper, or network, position in which any network 66 of unknown phase shift may be connected between the source 11 and the phase shifter 62.

The operation may now be considered in more detail. With the switches 21 to 24 in their left hand position, the phase shifters 18 and 19 are connected and the beam is deflected along the outer circle of the screen 37. The circuit including the harmonic generator 41 and the pulse generator 43 causes sixty light spots to appear, six degrees apart, as shown at A in FIG. 2. With the switches 21 to 24 still in their left hand position, the circuit including the phase shifter 47 and the pulse generator 48 causes a single light spot to appear, as shown at B in FIG. 2. The phase shifter 47 is next adjusted until the spot B coincides with one of the spots A, making one extra bright spot as shown at C in FIG. 3. The spots A and C constitute reference spots, or scale marks, and remain stationary.

Figure 3:
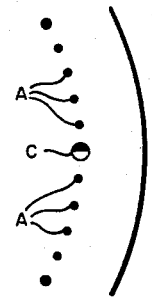

When the switches 21–24 are in their right hand position, the phase shifters 53 and 54 are in circuit, deriving energization from the harmonic generator 41, whereby the beam forms the inner circle. However, the pulse generators 43 and 48 do not cause any light spots to appear on the inner circle since they are short circuited at this time by the switches 23 and 24, and the screen continues to appear as shown in FIG. 3.

Figure 4:
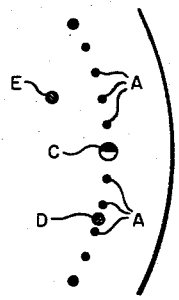
Figure 5:
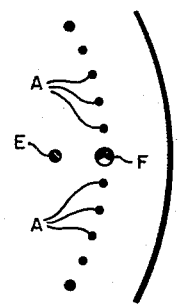

Calibration amounts to setting the zero, that is, adjusting the apparatus so that zero phase shift is indicated when zero phase shift exists. The switches 12 and 61 are turned to their set up position thereby connecting the source 11 directly to the phase shifter 62. As shown in FIG. 4, the pulse generator 63 places a light spot D on the outer circle and a light spot E on the inner circle. The phase shift introduced by the circuit of the phase shifter 62 and the pulse generator 63 is approximately the same as that introduced by the phase shifter 47 and the pulse generator 48 and accordingly the spot D will appear somewhere near the spot C. The spot E, however, may appear elsewhere on the circumference of the inner circle. Adjustment of the phase shifter 62 causes both of the spots D and E to move along their respective circles, the spot E making a complete revolution as the spot D moves through the distance between two spots A, which distance is six degrees. Adjustment of the phase shifter 62 is continued until the spot D coincides with the reference spot C, making a very bright spot F as shown in FIG. 5. This adjustment will not, in general, bring the spot E opposite the spot F and therefore the phase shifter 51, which affects the position of spot E only, is adjusted until the spot E is adjacent to the spot F, as shown in FIG. 5. The zero set adjustment is now completed and the apparatus is ready for use.

Figure 6:
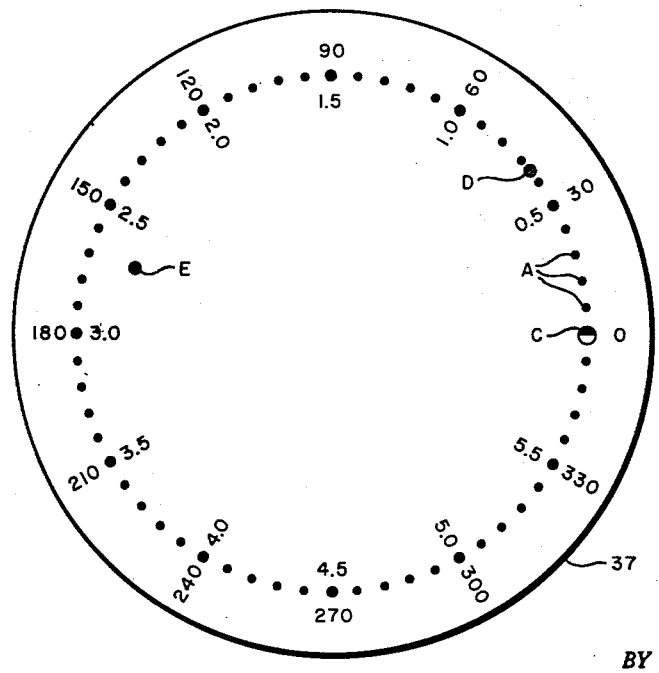

FIG. 6 shows schematically the entire screen 37 of the oscilloscope 36 as it appears in use. There can be seen the sixty spots A evenly spaced around the circumference, six degrees apart, which constitute the divisions of the scale. The extra bright spot C constitutes the reference, or zero position. As in the case of a clock, the spots C and A constitute the scale markings for both the coarse measure and the fine measure. Numerals have been added to FIG. 6 indicating quantitatively the phase difference represented by certain spots, the outer circle of numerals denoting the coarse scale calibration and the inner numerals denoting the fine scale calibration. Such markings may be placed on a transparent mask overlying the screen, as is well known.

As an example, suppose it is desired to obtain a voltage on terminal $T_2$ which is displaced in phase from the voltage on terminal $T_1$ by 38.7°. The switches 12 and 61 are turned to their normal positions, and, while observing the screen 37, the phase shifter 13 is adjusted. As the knob of the phase shifter 13 is moved, the bright spot D on the outer circle and the bright spot E on the inner circle both move, the spot E making a complete revolution for each six degrees of movement of the spot D. The desired phase shift of 38.7° lies between the coarse scale marks of 36° and 42° and accordingly the phase shifter 13 is adjusted until the spot D lies between these marks, as shown in FIGURE 6. Since 38.7° is 2.7° greater than 36°, adjustment is continued until the spot E lies opposite the 2.7° mark, referring to the fine scale, as shown in FIGURE 6. The voltage on the terminal $T_2$ is now displaced from that of terminal $T_1$ by 38.7°.

The apparatus of the invention may also be used in other ways. For example, the difference in phase between the reference voltage of oscillator 11 and an external voltage can be determined by turning the switch 12 to its set up position, turning the switch 61 to its normal position, applying the external voltage to terminal $T_2$, and reading the phase difference on the screen 37. As another example, the phase shift introduced by a network 66 of unknown characteristics can be determined by turning switches 12 and 61 to their network positions and reading the result on the screen 37.

It is apparent from the foregoing that the present invention enables phase difference to be read at a glance. The smallest divisions on the screen 37 are separated by one tenth of a degree, permitting direct reading to the nearest tenth of a degree and interpolation for more precise readings. The accuracy of the instrument is not dependent upon the use of precision components such as resistors and capacitors nor is it dependent upon the accuracy with which the values of the components are known.

Although a specific embodiment has been described, many modifications can be made within the spirit of the invention. It is therefore desired that the protection afforded by Letters Patent be limited only by the true scope of the appended claims.

What is claimed is:

1. Apparatus for measuring the phase angle between a first or reference voltage and a second voltage the phase of which is unknown, comprising, an oscilloscope, first circuit means connected to said first voltage and said oscilloscope for deflecting the beam of said oscilloscope in a first circular pattern once each cycle of said first voltage, second circuit means connected to said first voltage and said oscilloscope for deflecting the beam of said oscilloscope in a second circular pattern a plurality of times per cycle of said first voltage, third circuit means connected to said second circuit means and to said oscilloscope for placing a plurality of equally spaced light spots on the circumference of said first circular pattern, fourth circuit means connected to said first voltage and to said oscilloscope for brightening one of said plurality of spots, and fifth circuit means connected to said second voltage and said oscilloscope for placing one light spot on each of said circular patterns once each cycle of said second voltage, whereby the relative positions of said spots is a measure of the phase difference between said first and second voltages.

2. Apparatus for measuring the phase difference between first and second voltages, comprising, an oscilloscope including a viewing screen, deflection circuit terminals and an intensity control terminal, means energized by said first voltage for generating a first pair of voltages in phase quadrature with each other having a frequency equal to that of said first voltage, means for generating a third voltage harmonically related in frequency to said first voltage, means energized by said third voltage for generating a second pair of voltages in phase quadrature with each other having the frequency of said third voltage, means for applying said first and second pairs of voltages alternately to said deflection circuit terminals at a frequency which is low compared to that of said first voltage whereby said first pair of voltages generates a first circular pattern on said screen and said second pair of voltages generates a second circular pattern on said screen, means energized by said third voltage for generating a first series of voltage pulses, one per cycle of said third voltage, means for applying said first series of pulses to said intensity control terminal only while said first pair of voltages is applied to said deflection circuit terminals, means energized by said first voltage for generating a second series of voltage pulses, one per cycle of said first voltage, means for applying said second series of pulses to said intensity control terminal only while said first pair of voltages is applied to said deflection circuit terminals, means energized by said second voltage for generating a third series of voltage pulses, one per cycle of said second voltage, and means for applying said third series of pulses to said intensity control terminal continuously, whereby the positions of the light spots appearing on said screen caused by said third series of pulses relative to the position of the light spots caused by said first and second series of pulses constitute coarse and fine measures of the phase difference between said first and second voltages.

References Cited in the file of this patent
UNITED STATES PATENTS

| | | |
|---|---|---|
| 2,121,359 | Luck et al. | June 21, 1938 |
| 2,178,074 | Jakel et al. | Oct. 31, 1939 |
| 2,206,637 | Koch | July 2, 1940 |
| 2,234,830 | Norton | Mar. 11, 1941 |
| 2,285,038 | Loughlin | June 2, 1942 |
| 2,374,817 | Hardy | May 1, 1945 |
| 2,408,414 | Donaldson | Oct. 1, 1946 |
| 2,474,177 | Wild | June 21, 1949 |
| 2,626,306 | Eicher et al. | Jan. 20, 1953 |